United States Patent [19]

Brown

[11] 4,172,680
[45] Oct. 30, 1979

[54] ARMOUR UNIT FOR WAVE ENERGY ABSORPTION

[75] Inventor: Christopher T. Brown, St. Ives, Australia

[73] Assignees: Douglas Neil Foster, Frenchs Forest; Unisearch Limited, Kensington, both of Australia

[21] Appl. No.: 865,261

[22] Filed: Dec. 28, 1977

[30] Foreign Application Priority Data

Dec. 30, 1976 [AU] Australia ............... PC8641

[51] Int. Cl.² ............................... E02B 3/14
[52] U.S. Cl. ............................ 405/16; 405/21; 405/29; 405/30; 405/33
[58] Field of Search ............. 61/4, 3, 37; 405/16, 405/17, 15, 18, 33, 20

[56] References Cited

U.S. PATENT DOCUMENTS

| | | | |
|---|---|---|---|
| 3,096,621 | 7/1963 | Danel | 61/4 |
| 3,210,944 | 10/1965 | Svee | 405/33 |
| 3,597,928 | 8/1971 | Pilaar | 61/4 |
| 3,990,247 | 11/1976 | Palmer | 61/4 |

FOREIGN PATENT DOCUMENTS

| | | | |
|---|---|---|---|
| 966679 | 4/1975 | Canada | 61/4 |
| 1058770 | 11/1953 | France | 61/37 |
| 192842 | 11/1964 | Sweden | 61/37 |
| 676764 | 8/1952 | United Kingdom | 1405/16 |
| 1451065 | 9/1976 | United Kingdom | 61/4 |

Primary Examiner—Jacob Shapiro
Attorney, Agent, or Firm—Anthony G. M. Davis

[57] ABSTRACT

A breakwater, or similar structure, comprising a core of rubble, and an armouring layer overlying said core, said armouring layer being composed of individual armour units of hexagonal outer cross-section arranged in a honeycomb array, each of said armour units having an elongated, concrete body with longitudinal through water-passage means so that the porosity of the exposed face of the armouring layer is solely determined by the ratio of the cross-sectional area of said water passage means to the cross-sectional area of the concrete body.

19 Claims, 23 Drawing Figures

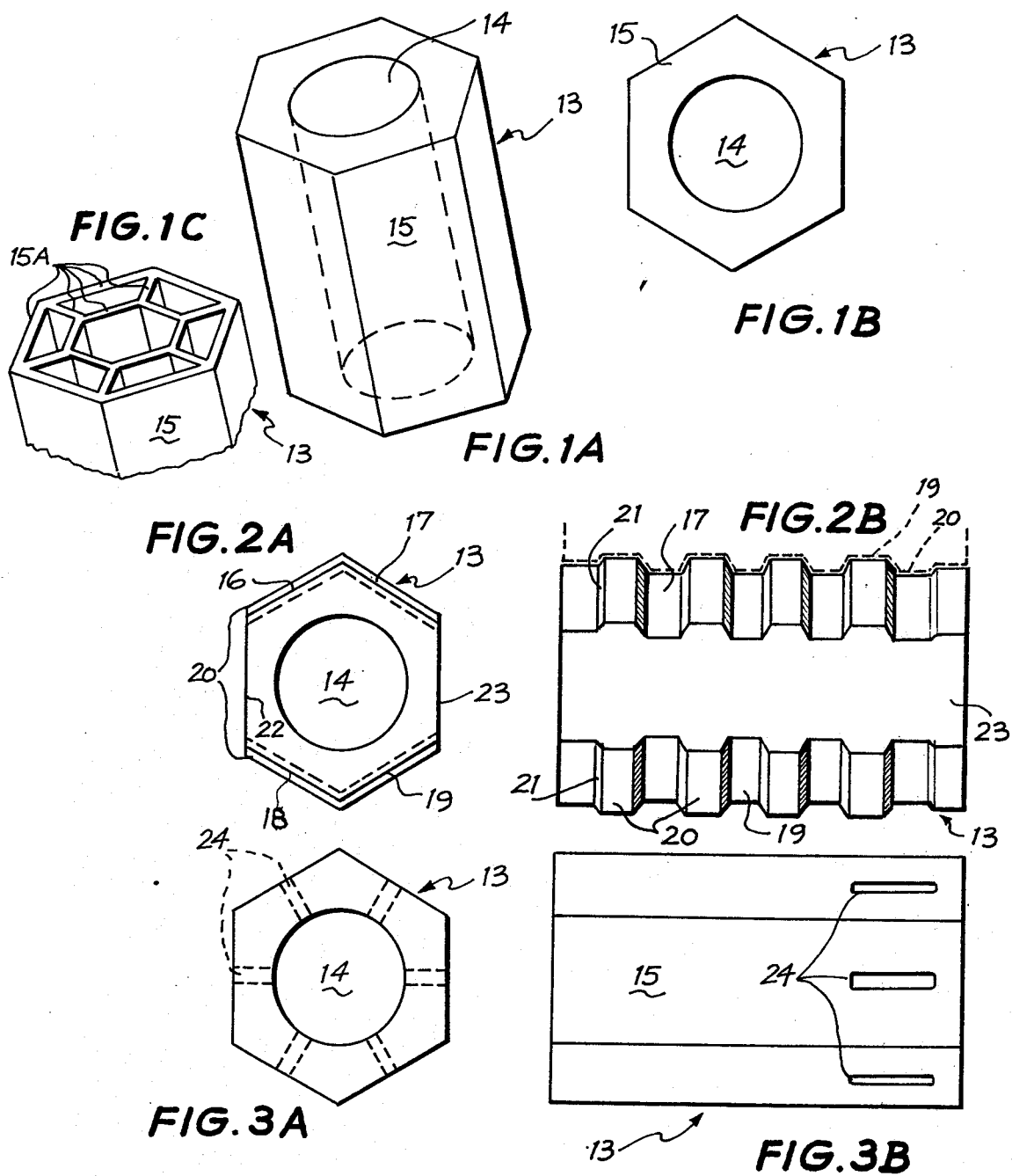

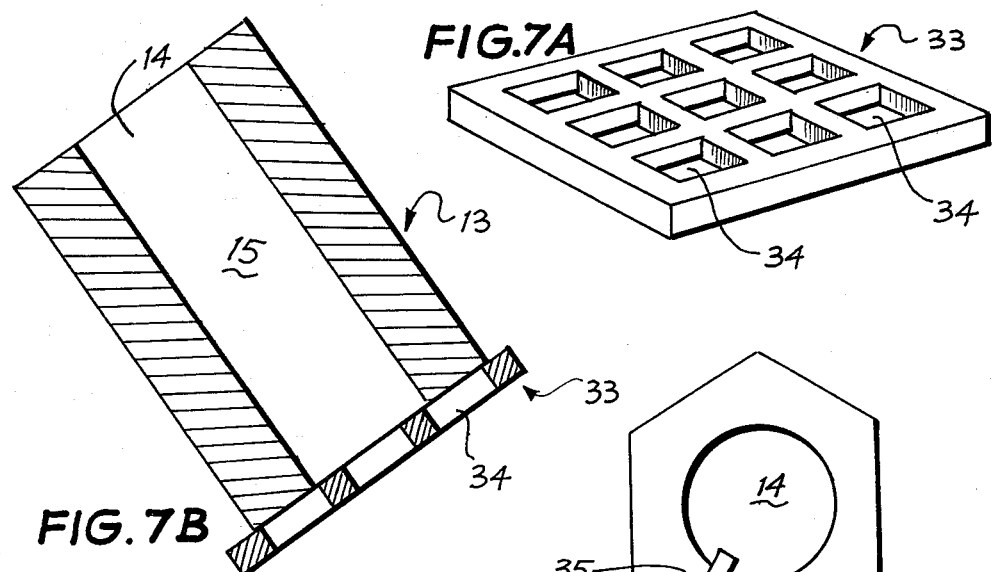
FIG. 7A
FIG. 7B
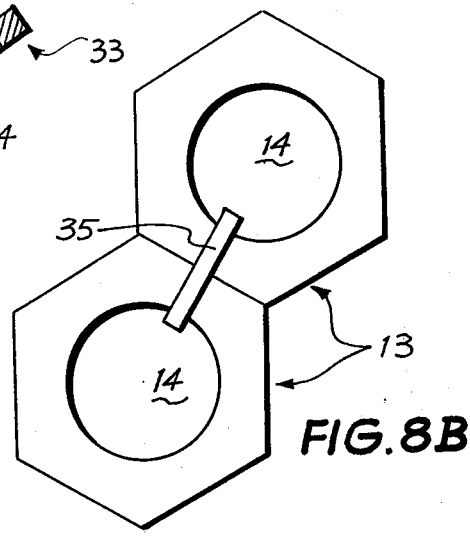
FIG. 8B
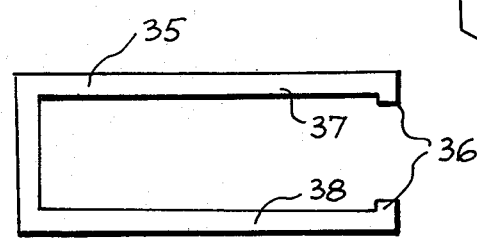
FIG. 8A
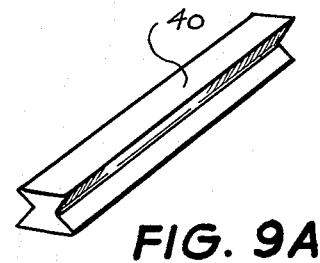
FIG. 9A
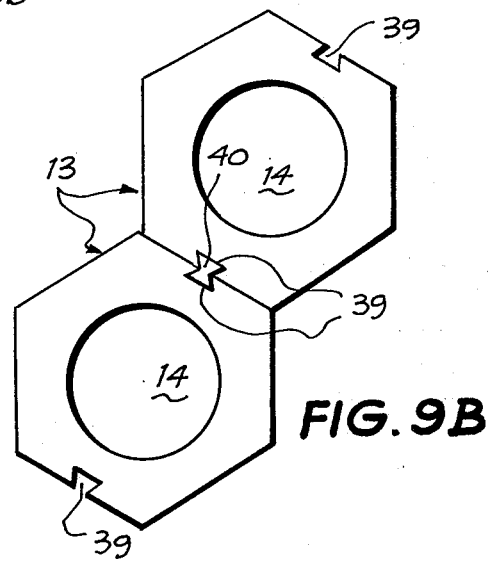
FIG. 9B

ARMOUR UNIT FOR WAVE ENERGY ABSORPTION

This invention relates to means for artificial armouring for breakwaters, revetments, seawalls and the like and more particularly to a hollow armour unit.

Early forms of breakwaters comprised two types, firstly, those of constructed walls of massive rock or concrete blocks, largely impermeable and of steep face, and secondly, the alternative of mounds of rock or concrete units piled randomly to a height sufficient to repulse all or most of the wave. These latter units function by absorption of the wave into the voids in the mass of the material, thus attenuating and dissipating part of the energy of the wave. However, natural rocks are not the most stable shape for the outer or armour layer and endeavours have been made to provide more stable substitutes, either by selection of stone, careful quarrying or by artificial manufacture.

Initially, these endeavours have been concerned with developing "better rocks", whereby the interlock, unit-to-unit, is improved but the necessary voids are found in the interstices between units (viz. the tetrapod, the tribar, the dolos and the dinosaur). Somewhat after the tretrapod consideration was given to hollow units and a massive form of simple external shape, but complex internal shape, was suggested (which was consequently difficult and costly to make) with a voids ratio of between 20% and 60%. Other developers, apparently ignorant of this work, also considered the beneficial effect of voids in reducing the effect of the hydrostatic forces, which tend to push outward on the armour units.

Simultaneously with this development, empirical theorists have developed mathematical relationships relating the known factors of units, together with other factors presumed or assumed to apply. The best known of these is Hudson's equation, which was developed to take account of rock and rock type units. Its further application to voided-type units has been subject to much debate. This formula says that $$M = \frac{H^3 \cdot \rho}{S_S^3 \cdot K_D \cdot \cot \alpha}$$

where
 M = weight of the unit
 $\rho$ = mass density of the unit
 $S_S$ = relative submerged density of the unit to the immersing fluid
 $\alpha$ = the angle of the slope to the horizontal
 $K_D$ = "stability factor" or "coefficient of damage" i.e. a coefficient which is determined empirically from laboratory tests and confirmed by prototype experience.

This formula has long been held to indicate the required mass of a unit of a given shape, such as a rock or a dolos. Now, if V, the volume of the unit, is related to a characteristic dimension of a unit, such as its height normal to the slope, $L_N$, by a relationship of the form $$V = K_V L_N^3$$

Thus, $$L_N = \frac{H}{S_S (K_V K_D \cot \alpha)^{\frac{1}{3}}}$$

and if t is the net thickness of material on the slope, and p is the voids ratio $$t = L_N(1-p)$$

It is now proposed through this invention, whereas all blocks to date have, in practice, been realised as being substantially cubical, that this may not in fact be necessary but may just be a relic of the concept of a "better rock".

Considering the forces acting on an armour layer, these forces can be resolved into two components, one parallel to the slope, the other normal thereto. Disturbance and removal of an armour unit is caused by a combination of these vectors so that either a unit is pushed out from the slope, thus being subjected to greater forces, or an initial wave so moves the unit that it is more susceptible to the forces of subsequent waves.

Now the head losses and thus pressure differentials, in flowing water are maximized by complex waterways of random path and section, and minimized by flowing in smooth walled pipes. It is also known that drag forces are high for objects of high to thickness breadth ratios and also for high wetted surface area to mass ratios. Further, armour units where high drag forces can be developed at advantageous lever arms compared to that of the centre of gravity are more likely to suffer rotational disturbance. It is also a known fact that elements having face to face contact will be in a more stable array than elements in line or point contact. Yet few, if any, blocks appear to have been designed to take these considerations into account.

In the practical art, it is also important to have units that are easy to manufacture, are as light as is practicable, given their function, and given the common material of manufacture have a minimum propensity to generate tensile stresses. Further, as it is common that at the time of the original concept of a scheme the wave climate is but poorly known, possible variations in wave climate (or available material density) should, if possible, not result in large variations in the requirements for the weight of the unit. However, in any substantially cubical unit, wherein all dimensions are given as a factor of a key dimension and are commonly substantially the same as it, unit mass will change as the cube of the required change in dimension. By using a linear relationship in the design of a unit, these factors could be avoided.

It is therefore now proposed that, by considering again the function of the armour layer in terms of the remodelled Hudson equation, it can be appreciated that an armour layer, undisturbed by wave action, serves to surcharge the soil (rock) particles of the porous embankment so that their stability under the dynamic pore water pressures is maintained, and that a linear relationship probably exists between the incident wave and the minimum required surcharge. By interposing a suitable armour layer between the slope parallel force vector and the surface particles so that water is constrained to flow normally into the slope (or in some other more-stable uniform direction) additional stability can be obtained. If in addition the units themselves present a minimum surface area to the disturbing forces, further advantage may be gained. Lastly, the pattern of placement should be such that face to face contact is maximized, compressive forces predominate and that the pattern should be minimally susceptible to the loss of a unit or a number of units, with minimum effect on the above qualities.

With many of the armour units presently in use, many of the impact and drag forces experienced in service act on masses with a considerable lever arm from the unit such that rotational movement may be induced about the centre of gravity. This motion can induce wear and also rotate the unit so that progressively greater forces are engendered and unit extraction follows. The ideal purpose of an armour unit may be defined as to so modify the flow characteristics of the incident waves that the stability of the rock, or soil, mount is not endangered. Secondary desirable characteristics are that the cost of the structure should be minimized and that no undue secondary effects, such as navigational hazards, engendered.

To consider the structure, then, as a storage system for wave mass, what is required is a system of regulating the wave ingress and egress to the mound so that the transient porepressures are within reasonable bounds and the energy flux attenuated or destroyed. This may best be managed by controlling the size of the voids in the armour layer of the structure. The invention is based upon the realization that this can be positively effected by sizing the void and encasing this unit void or orifice in the minimum sized concrete unit for construction and structural purposes. If the armour units be arranged with cleavage planes normal to the surface and the major void axially through the centre, the rotational forces on the unit and hydraulic forces across the armour layers are minimized. Moreover, individual unit failure can only come about by motion parallel to the cleavage plane and requires a force of some finite duration to move the unit along the plane to the extent required to complete extraction.

It has been found that in designing a patterned layer, care must be exercised to ensure that the loss of a small number of units does not cause the breakdown of the entire pattern, and that flaws in the pattern do not induce large internal stresses in the individual units. It has also been found that a hexagonal arrangement will tolerate all these conditions.

To this end the invention provides an armour unit for use in a structure, such as a breakwater, to resist hydrodynamic forces, said unit comprising an elongated, concrete body having longitudinally extending through water passage means, and longitudinally extending flat side walls terminating at opposite ends in end faces to provide an external hexagonal cross-sectional shape to said body.

The invention also provides a structure, such as a breakwater, for resisting hydrodynamic forces and comprising an inclined embankment of rubble, and a superficial armouring layer overlying said rubble, said armouring layer being provided by a plurality of juxtaposed armour units of the above kind disposed in a tightly packed, honeycomb-like array upon said embankment thereby to present an outwardly facing surface whose porosity is determined substantially entirely by the ratio in respective ones of said armour units of the cross-sectional area of said water passage means to the area of one of said end faces.

By providing the armouring layer as a tightly packed honeycomb-like array of armour units each of outer hexagonal cross-section, the interstices are reduced to zero, subject to production tolerances, and a stable coherent pattern is produced which satisfies all the requirements noted above. By virtue of varying the wall thickness, armour unit mass and porosity may be increased or decreased with a constant external shape. By varying the length, the mass of the unit may be changed without affecting porosity. By varying the porosity of one unit compared to the next, the effective hydraulic radius of the slope can be altered without affecting the surcharge.

Thus, an armour unit is provided whereby, compared to contemporary units, (a) the mass of an individual unit is all but independent of its surface area, (b) the minimum mass has a linear relationship to the design wave height, (c) the basic form of the armour unit allows for simple corrections due to changes in design parameters or material quality, (d) the porosity of the surface can be selected and hence some control exercised over the characteristics of run-up and reflection and further, these characteristics can be varied over the slope as theory, practice or aesthetics may require, without major departure from the constructing mould, and (e) the mass may be an order less than currently accepted units, such as the dolos unit, for equal duty.

(f) The construction sequence above the foundation row is simple and straight forward.

Modification to the basic shape can allow for increased interlock between units, the provision for tie or anchorage bars, the venting of air and for allowing some downslope water flow within the armouring layer when sufficiently permeable under layers and core cannot be constructed.

In the presently preferred form of construction, of a breakwater, the core material, which should be elastically consolidating and subject to a minimum of particle degradation, is commonly made of sand or quarry run material. This material is protected against loss of fines by a natural filter composed of layers of graded stone or by a filter cloth with a layer of suitably sized and graded, durable stones to provide both protection to the filter materials, the required volume of voids to accommodate the incoming waves in service, and during construction, to provide a temporary external armouring layer. This armouring layer may comprise one or more layers, and might even include provision for adequate or preferential downslope draining in the form of drains or suitable artificial units. In the case of an impermeable layer, it may be suitable to provide part of this drainage by incorporating slots or vents in the body of the armour unit. In this case their projected area normal to flow through the pipe should be minimal.

The invention will now be described in greater detail with reference to the accompanying drawings, in which:

FIGS. 1A and 1B are a perspective and plan, respectively, of a basic form of armour unit according to this invention; FIG. 1C shows a modification of FIG. 1A;

FIGS. 2A and 2B are a plan and elevation, respectively, of a modified form of the armour unit;

FIGS. 3A and 3B are similar views of a third form;

FIG. 7A shows a complementary grillage unit, and FIG. 7B is an elevation of a basic armour unit including same;

FIG. 8A shows a complementary coupling clamp, and FIG. 8B is a plan of two basic armour units coupled by said clamp;

FIG. 9A is a perspective view of a complementary coupling strip, and FIG. 9B shows in perspective two basic armour units coupled by said strip;

Figure 4A:
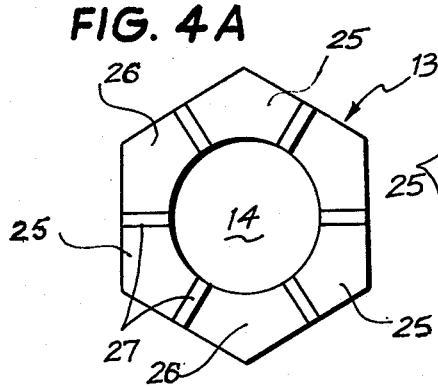
FIGS. 4A and 4B are similar views of a fourth form.

The device shown in FIGS. 1A and 1B represents a basic form of armour unit 13 which when employed in numbers is capable of comprising an armouring superficial layer for a breakwater of this invention. The device has a longitudinally extending through water passage 14 and its body 15 is composed of concrete which may be precast of cast in situ upon the breakwater. Preferably, the unit 13 is formed by a conventional centrifugal moulding, or casting, process thus resembling in some respects a spun-cast concrete pipe. The body is elongated and provided with open opposite ends with its side walls composed of six longitudinally extending flattened portions to accord to the body a hexagonal cross-sectional shape, uniform throughout its length. The simplicity of construction of the armour unit 13 is obvious, especially as it will be realised that when composed of mass or fibre concrete a plurality of units may be formed by dividing into several lengths one integral casting. Furthermore, it will be a simple matter to modify the wall thickness, length, weight and other features of the armour unit 13, as desired. FIG. 1C shows a form with modified and symmetrical passageways 14A of polygonal cross section. It will be noted that the thickness of the peripheral and partition walls 15A; is uniform.

FIGS. 2A and 2B depict a form of armour unit 13 of similar shape to the above basic form and including two adjacent pairs of faces 16-17 and 18-19 provided with spaced transverse ribs 20 having chamfers 21 on their side walls. The ribs 20 are discontinuous due to their omission from faces 22 and 23. The provision of flat faces 22 and 23 is to facilitate their assembly into the armouring layer of a breakwater. Preferably, in this form all of the side faces at opposite end portions of the armour unit 13 are made of mating configuration, whereby one armour unit 13 interlocks with an adjacent unit 13 on one face only and only when these two units 13 are in opposite end-on-end orientation. Thus, if an armouring layer on an embankment is to be formed from armour units 13 of this interlocking form and the plain flat faces 22 and 34 thereof are disposed either vertically or horizontally, interlocking will occur between units 13 in all diagonals with consecutive units 13 in each diagonal being of reverse end-on-end orientation with respect to the preceding unit 13.

A modification of the armour unit 13 is shown by FIGS. 3A and 3B in which radial slots 24 are provided in some or all of the flat faces of the body 15. The slots 24 may be of any one of many shapes and lengths and need not be symmetrically arranged on the walls of the body 15. Preferably, however, the slots 24 provide radial access apertures to the central void, i.e. the through water passage 14. They may be formed by the use of removable radial cores in the centrifugal mould. Thus this form of armour unit 13 also may be mass produced by factory methods as opposed to prior art forms of solid concrete armour units. The radial apertures 24 will permit the escape from the internal void of the body 15 of water from incident waves as well as air trapped within the voids by the ingress of such water. The slots also allow for the bolting or strapping together of individual units to form a compound unit.

Figure 4B:
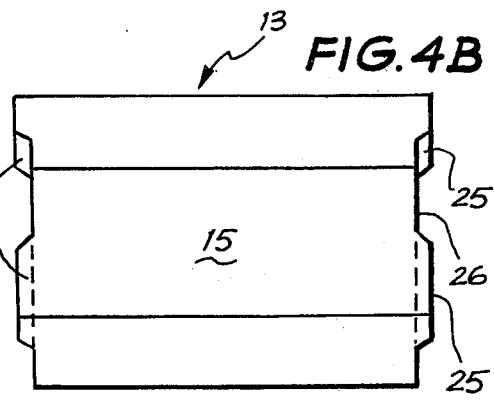

The basic form of armour unit 13 may be modified as shown in FIGS. 4A and 4B by the provision at opposite ends of the body 15 of symmetrical projections 25. As shown more particularly in FIG. 4A, each projection is preferably of generally polygonal shape, equally spaced around an end face of the body 15 and being formed at the position of alternate corners of the hexagonal shape. Each projection is outwardly spaced from the end face 26 by inclined side walls 27. The purpose of the end projections 25 is to function as feet upon which the body 15 of the armour unit 13 may stand upon an impervious under layer. By this provision downslope water is permitted to drain over the outer face of the under layer and beneath the armour units 13.

Figure 5A:
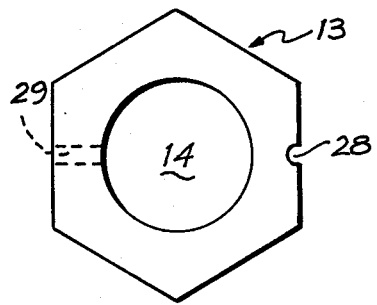
FIGS. 5A and 5B are similar views of a fifth form.
Figure 5B:
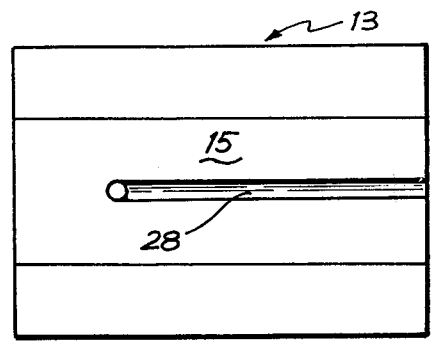

FIGS. 5A and 5B show the provision in a basic armour unit 13 of a longitudinally extending lateral groove 28 in one side face of the body 15 and a radial port 29 on an opposite face of the body 15. The groove 28 is open at one end to an end face of the body 15 and terminates short of the opposite end thereof at a position corresponding to an intermediate position directly opposite that at which the port 29 is provided in the opposite face. Thus, when two armour units are in juxtaposition with the groove 28 of one confronting the port 29 of the other a passage is defined between the two adjacent armour units 13 communicating with the internal void 14 to permit the escape of air trapped within said void 14 with the ingress of water from a incident wave on the breakwater.

Figure 6A:
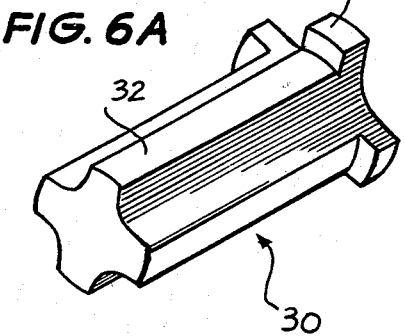
FIG. 6A shows in perspective a complementary internal fitment.
Figure 6B:
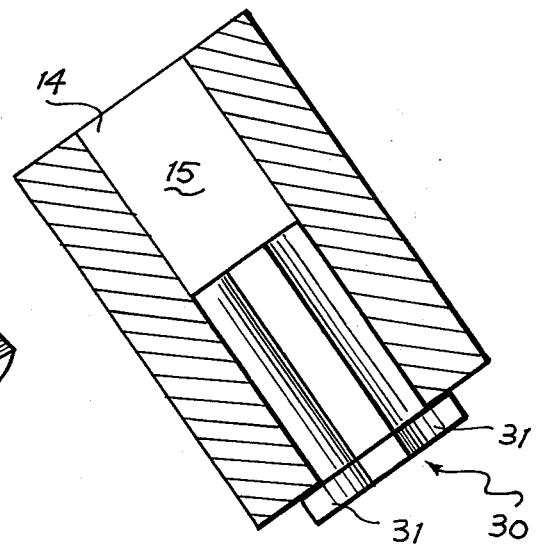
FIG. 6B is a longitudinal section of a basic armour unit including same.

As an alternative to the foot projections 25 shown in FIGS. 4A and 4B a complementary, elongated fitment 30 of substantial cruciform cross-sectional shape may be provided for introduction from one end of the body 15, as shown in FIG. 6B as a jamb fit within the waterway 14. Laterally and longitudinally extending feet 31 are provided at one end of the respective arms 32 of the fitment 30. As shown by FIG. 6B the feet 31 stand proud of the end face of the body 15 to support same from the under layer of the embankment of a breakwater. Water and air is therefore free to flow down the void 14 of body 15 and between the arms of the fitment 30 to escape through the end of the body 15.

As a further alternative a basic, or modified, form of the armour unit 13 may be stood upon a grillage unit 33 shown in FIG. 7A which may be constructed of metal, thermoplastic or other suitable material. Water will then be free to flow from the void 14 within the body 15 through the openings 34 within the grillage unit 33. The use of a grillage unit 33 will permit the application of small fill material for the under layer of the breakwater.

In the thermoplastic armour units 13 as a superficial armouring layer upon a breakwater it may be required to clamp adjacent units 13 together, and this may be achieved by the provision of a metal U-shaped clamp 35 with return claws 36 as shown in FIG. 8A. The clamp 35 will be applied by inserting its arms 37 and 38 downwardly into the water passageways 14 of a pair of adjacent armour units 13 so that the return claws 36 either grip beneath the end face thereof or within the voids 14 to retain the two armour units in juxtaposition. Alternatively, opposite side faces of the adjacent armour units 13 may be provided with rebates 39 as shown in FIG. 9B which together accept in dovetail fashion a formed joining strip 40 as shown in FIG. 9A. The strip 40 may be composed of rubber, thermoplastic or other material.

Figure 13:
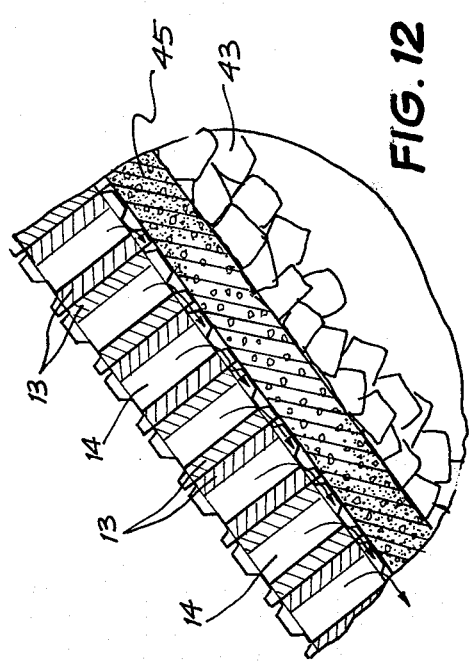
FIG. 13 shows in perspective a fragment of the breakwater of FIG. 10 depicting the honeycomb interlocking pattern of the armour unit.
Figure 11:
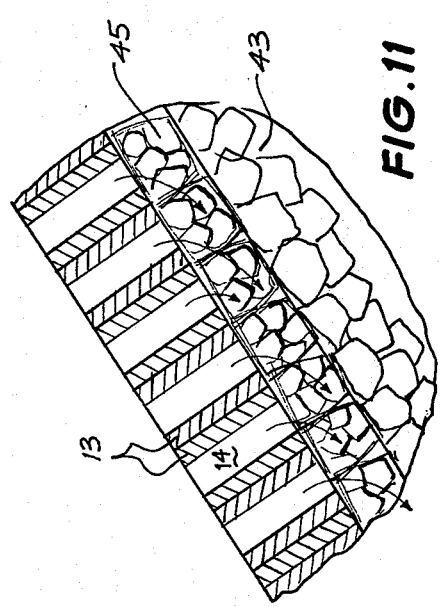
FIG. 11 is a fragmentary elevation of the breakwater of FIG. 10.
Figure 10:
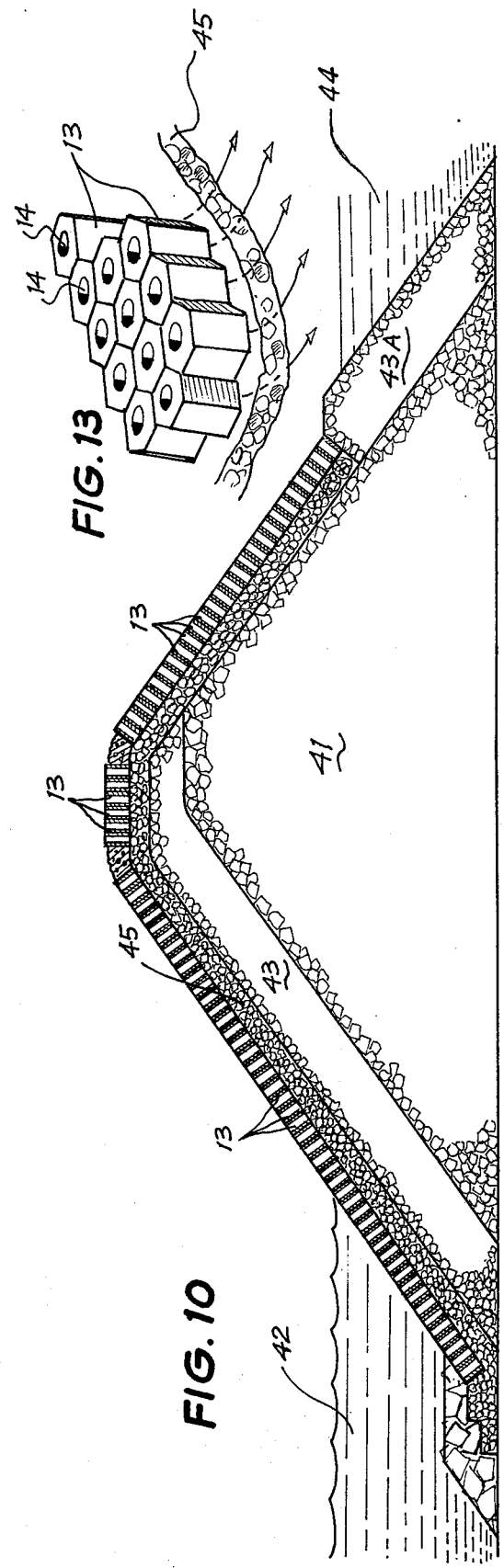
FIG. 10 is a transverse section through a breakwater constructed according to this invention.

A plurality of armour units 13, preferably selected from the several types described above, will be laid in honeycomb fashion as shown in FIG. 10, and more particularly in FIG. 13, upon a base core 41 of quarry run material, preferably of fine grain stone, sand, or the like. The core 41, at least on the side exposed to the open sea 42, is covered by a core layer 43 of coarser rock fill. As shown in the drawing the core layer 43 is also applied as a layer 43A low down on the core 41 on the harbour side 44 of the breakwater. The exposed faces of the core 41 and core layer 43 are then covered by an under layer 45 of porous material shown with greater particularity in FIG. 11. A plurality of armour units 13 are then applied in tightly-packed juxtaposition, in honeycomb fashion, over the under layer 45 with each armour unit 13 disposed substantially vertical to the under layer 45. Where basic armour units 13 are used as shown in FIG. 11 downslope water entering the voids 40 of the units 13 flows through the porous material of the under layer 45 as revealed by the arrows shown in FIGS. 11 and 13.

Figure 12:
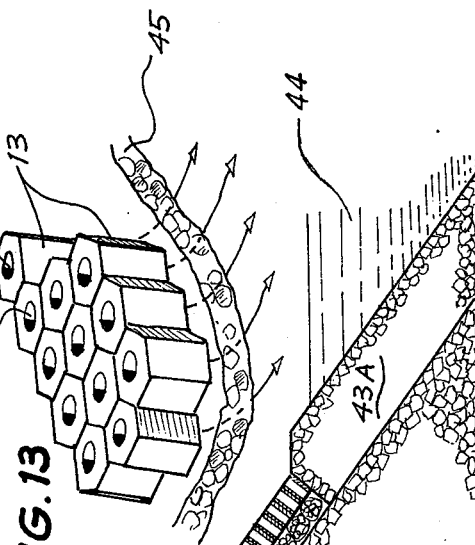
FIG. 12 is a similar view of the breakwater having a substantially impervious under layer and utilizing armour units as shown in FIGS. 4A and 4B.

As shown by FIG. 13 good inter-unit friction is obtained and, as indicated by relationship to the arrows signifying the direction of the downslope water, each armour unit 13 is composed with an opposite pair of flat outer side faces in vertical alignment. Such a construction of the honeycomb pattern ensures a convenient and rapid form of assembly of the array, while preserving proper order and spacing of the Units 13 despite some variations in dimensions due to manufacturing tolerances.

Where the under layer 45 is formed from permeable material, such as concrete, the armour units 13 will preferably include feet such as the projections 25 depicted in FIGS. 4A and 4B. The arrangement is shown in FIG. 12 from which it will be seen that downslope water is free to flow over the impermeable surface of the under layer 45 and beneath the armour units 13.

Several forms of armour units and of a breakwater incorporating same have been described in the foregoing passages but it should be understood that other forms, modifications and refinements are possible within the scope of this invention.

What I claim is:

1. A structure, such as a breakwater revetment or the like, suitable for resisting hydraulic forces and comprising a superficial armouring layer disposed on an underlying surface of the earth and consisting of a plurality of juxtaposed armour units each comprising an elongate body, of substantially uniform hexagonal cross-section along its longitudinal axis, defining longitudinally extending side walls and opposite ends with water passage means of substantially uniform cross-section extending through the body and terminating at the opposite ends, the units being tightly packed in a honey-comb like array with a plurality of side walls of each unit being in intimate contact with walls of adjacent units and with the axes of adjacent units being substantially parallel to one another thereby to present an outwardly facing surface, the layer's porosity being determined substantially entirely by the ratio, in respective ones of the units, of the cross-sectional area of the passage means to the area of one of the end faces and the thickness of the layer being determined in accordance with the formula $$t = \frac{H(1 - \rho)}{S_S(K_v K_D \cot \alpha)^{\frac{1}{3}}}$$

where
$V = K_v L_n^3$ and
t is net thickness of material of the layer,
H is wave height,
$S_s$ is relative submerged density of the unit to the immersing fluid,
$K_D$ is stability factor,
α is angle of slope to the horizontal,
p is voids ratio,
V is volume of the unit, and
$L_N$ is length of unit normal to the underlying surface.

2. A structure as claimed in claim 1, wherein said porosity is no more than 60%.

3. A structure as claimed in claim 1, wherein said underlying surface includes a core and an impervious underlayer thereon, said armour units stand substantially perpendicularly on said underlayer, and said armour units have foot projections permitting downslope water flow between said impervious underlayer and a lower end of said armour unit array.

4. A structure as claimed in claim 1, wherein each of said armour units has interlocking corrugations formed in less than all of its outer walls, which corrugations being interlocked with corresponding ribs on at least some adjacent ones of said armour units in said array.

5. A structure as claimed in claim 1, wherein radial passages are provided in at least some of the walls of each of said armour units through which water and air may pass from said water passage means.

6. A structure as claimed in claim 1 wherein said porosity is obtained by the incorporation in said surface of armour units having dissimilar individual porosities.

7. A structure as claimed in claims 1, wherein said porosity is different in different parts of said structure's surface and is greater in those of said parts closer to mean water level.

8. A structure as claimed in claim 1, wherein said through passage means in each of said armour units comprises a plurality of passages symmetrically arranged about the longitudinal axis of said armour unit.

9. A structure as claimed in claim 1, wherein said armour units in said armouring layer are oriented with an opposite pair of their side wall faces disposed vertically.

10. A structure according to claim 1 wherein the thickness of the layer being determined by the formula is the minimum thickness.

11. A structure according to claim 1 wherein at least four side walls of each unit are in said intimate contact.

12. An armour unit, for use in a structure such as a breakwater revetment and the like, comprising an elongate body, of substantially uniform hexagonal cross-section along its longitudinal axis, defining longitudinally extending substantially continuous side walls and opposite ends with water passage means of substantially uniform cross-section extending through the body and terminating at the opposite ends, the units being adapted to be tightly packed in a honey-comb like array with a plurality of side walls of each unit being in intimate contact with walls of adjacent units and with the axes of adjacent units being substantially parallel to one another thereby to form an armoring layer with the thickness of said layer corresponding to the length of said units, whereby when the units are so packed, the structure's porosity is determined substantially entirely by the ratio, in respective ones of the units, of the cross-sectional area of the passage means to the area of one of the end faces and the minimum thickness of the layer is determined substantially in accordance with the engineering formula $$t = \frac{H(1-\rho)}{S_S(K_v K_D \cot \alpha)^{\frac{1}{3}}}$$

where
$V = K_v L_n^3$ and
t is net thickness of material of the layer,
H is wave height,
$S_s$ is relative submerged density of the unit to the immersing fluid,
$K_D$ is stability factor,
$\alpha$ is angle of slope to the horizontal,
P is voids ratio,
V is volume of the unit, and
$L_N$ is length of unit normal to the underlying surface.

13. An armour unit according to claim 12 having foot projections to permit water flow between an impervious underlayer of a said structure and the lower end of the armour unit.

14. An armour unit according to claim 12 having corrugations, in less than all of its side walls, adapted to interlock with corresponding corrugations on at least some adjacent units in a said structure.

15. An armour unit according to claim 12 having radial passages, provided in at least some of said side walls, through which water and air may pass from said passage means.

16. An armour unit as claimed in claim 12, wherein said through passage means comprises a plurality of passages symmetrically arranged about said unit's longitudinal axis.

17. An armour unit according to claim 12 wherein at least four side walls of each unit are in said intimate contact.

18. A structure, such as a breakwater, revetment and the like, suitable for resisting hydraulic forces and comprising a superficial armouring layer disposed on an underlying surface of the Earth and consisting of a plurality of juxtaposed armour units each comprising a body of substantially uniform hexagonal cross-section along its longitudinal axis, defining longitudinally extending side walls and opposite ends with water passage means of substantially uniform cross-section extending through the body and terminating at the opposite ends, the units being tightly packed in a honey-comb like array with a plurality of side walls of each unit being in intimate contact with walls of adjacent units and with the axes of adjacent units being substantially parallel to one another thereby to present an outwardly facing surface, the layer's porosity being determined substantially entirely by the ratio, in respective ones of the units, of the cross-sectional area of the passage means to the area of one of the end faces.

19. An armour unit, for use in a structure such as a breakwater, revetment or the like, comprising a body, of substantially uniform hexagonal cross-section along its longitudinal axis, defining longitudinally extending side walls and opposite ends with water passage means of substantially uniform cross-section extending through the body and terminating at the opposite ends, the units being adapted to be tightly packed in a honey-comb like array with a plurality of side walls of each unit being in intimate contact with walls of adjacent units and with the axes of adjacent units being substantially parallel to one another thereby to form an armouring layer in said structure with the thickness of said layer corresponding to the length of said units, whereby when the units are so packed, the layer's porosity is determined substantially entirely by the ratio, in respective ones of the units, of the cross-sectional area of the passage means to the area of one of the end faces and the minimum thickness of the layer is determined substantially in accordance with the engineering formula $$t = \frac{H(1-\rho)}{S_S(K_v K_D \cot \alpha)^{\frac{1}{3}}}$$

where
$V = K_v L_n^3$ and
t is net thickness of material of the layer,
H is wave height,
$S_s$ is relative submerged density of the unit to the immersing fluid,
$K_D$ is stability factor,
$\alpha$ is angle of slope to the horizontal,
P is voids ratio,
V is volume of the unit, and
$L_N$ is length of unit normal to the underlying surface.

* * * * *